United States Patent

Hayami et al.

[11] Patent Number: 5,907,196
[45] Date of Patent: May 25, 1999

[54] IRRADIATION DIRECTION CONTROL APPARATUS FOR VEHICULAR LAMP

[75] Inventors: Toshihisa Hayami; Makoto Izawa; Kazuki Takahashi, all of Shimizu, Japan

[73] Assignee: Koito Manufacturing Co., Ltd., Tokyo, Japan

[21] Appl. No.: 08/847,362

[22] Filed: Apr. 24, 1997

[30] Foreign Application Priority Data

Apr. 26, 1996 [JP] Japan ..................................... 8-129323

[51] Int. Cl.$^6$ ....................................................... B60L 1/14
[52] U.S. Cl. ........................... 307/10.8; 315/79; 362/466
[58] Field of Search .................................. 307/10.8, 157; 315/77–80, 82; 362/61, 66, 71, 233, 276, 285, 384, 459, 464, 465, 466

[56] References Cited

U.S. PATENT DOCUMENTS

| | | | |
|---|---|---|---|
| 4,968,896 | 11/1990 | Shibata et al. | 307/10.8 |
| 5,191,530 | 3/1993 | Hussmann et al. | 362/71 |
| 5,479,323 | 12/1995 | Shibata et al. | 362/71 |
| 5,562,336 | 10/1996 | Gotou | 362/71 |
| 5,580,148 | 12/1996 | Liao | 362/71 |

FOREIGN PATENT DOCUMENTS

| | | | |
|---|---|---|---|
| 31 29 891 | 6/1991 | Germany | B60Q 1/08 |
| 42 02 908 | 8/1993 | Germany | B60Q 1/10 |
| 38 39 427 | 10/1993 | Germany | B60Q 1/115 |
| 43 11 669 | 10/1994 | Germany | B60Q 1/10 |
| 59-195441 | 11/1984 | Japan . | |
| 729401 | 1/1995 | Japan . | |
| 737405 | 2/1995 | Japan . | |

*Primary Examiner*—Richard T. Elms
*Attorney, Agent, or Firm*—Sughrue, Mion, Zinn, Macpeak & Seas, PLLC

[57] ABSTRACT

An irradiation direction control apparatus for a vehicular lamp including: a vehicle state detection device for detecting a state of a vehicle; a drive device for directing irradiation light of a lamp toward a desired direction; and a compensation calculation device for performing a compensation calculation to keep the irradiation light of the lamp to a predetermined direction in accordance with a signal from the vehicle state detection device and sending a compensation signal to the drive device, whereby at the time of lighting the lamp or during lighting of the lamp, the compensation calculation device performs the compensation calculation to keep the irradiation light of the lamp to the predetermined direction in accordance with the signal from the vehicle state detection device and sends the compensation signal based on a calculation result to the drive device to drive the lamp or components thereof, whereas at the time of deactivating the lamp or during deactivation of the lamp and with a power source of the vehicle in operation or during running of the vehicle, the compensation calculation device performs only the compensation calculation to keep the irradiation light of the lamp to the predetermined direction in accordance with the signal from the vehicle state detection device and does not send the compensation signal to the drive device.

15 Claims, 6 Drawing Sheets

IRRADIATION DIRECTION CONTROL APPARATUS FOR VEHICULAR LAMP

BACKGROUND OF THE INVENTION

1. Field of the Invention

The present invention relates to an irradiation direction control apparatus for a vehicular lamp, which detects the state of a vehicle and compensates the irradiation direction of the lamp to always keep it to a given direction.

2. Description of the Related Art

There is a so-called auto-leveling apparatus which automatically adjusts the irradiation direction of a lamp installed in a vehicle in such a way as to maintain the irradiation direction of the lamp to a predetermined direction even when the inclination of the vehicle changes. This type of apparatus has detection means for detecting the inclination and height of a vehicle which varies depending on the running conditions, the passenger conditions (the number of passengers, the positions of passengers in the vehicle, etc.), and/or the conditions on the carrying capacity. This apparatus computes the amount of a change in the inclination of the vehicle based on information acquired by the detection means, and compensates the initial adjustment values like the irradiation angle of the lamp in such a way that the irradiation of the lamp always becomes a predetermined status, thereby providing predetermined light distribution.

When a load is applied to the rear side of a vehicle due to a change in acceleration while the vehicle is running, for example, the irradiation direction of the lamp, if not adjusted, is shifted upward from the reference direction. In this respect, the inclination angle along the vehicle is obtained and the irradiation axis of the lamp is inclined downward to always keep the irradiation direction of the lamp to the reference direction. That is, so-called leveling adjustment is performed.

Since the conventional auto-leveling apparatus is activated by an automatic switch irrespective of the operational conditions and/or the running conditions of a vehicle, it suffers large power consumption and shorter life.

If the auto-leveling apparatus operates when the engine of the vehicle is running and when an activation switch for the lamp is not set on, the power consumption unnecessarily increases and the life of the apparatus becomes shorter. If the apparatus is fully deactivated in this case, however, it undesirably takes time for the apparatus to be functional immediately after the activation switch of the lamp is later set on.

SUMMARY OF THE INVENTION

Accordingly, it is a primary objective of the present invention to provide an apparatus, which controls the operation of an auto-leveling apparatus in accordance with the operation or running conditions of a vehicle and a lamp lighting instruction or the lighting state of a lamp to prevent wasteful power consumption and a reduction in the life of the auto-leveling apparatus and improve the statability of the auto-leveling apparatus.

To achieve this object, there is provided an irradiation direction control apparatus for a vehicular lamp, which comprises vehicle state detection means for detecting a state of a vehicle; drive means for directing irradiation light of a lamp toward a desired direction; and compensation calculation means for performing a compensation calculation to keep the irradiation light of the lamp to a predetermined direction in accordance with a signal from the vehicle state detection means and sending a compensation signal to the drive means, whereby at the time of lighting the lamp or during lighting of the lamp, the compensation calculation means performs the compensation calculation to keep the irradiation light of the lamp to the predetermined direction in accordance with the signal from the vehicle state detection means and sends the compensation signal based on a calculation result to the drive means to drive the lamp or components thereof, whereas at the time of deactivating the lamp or during deactivation of the lamp and with a power source of the vehicle in operation or during running of the vehicle, the compensation calculation means performs only the compensation calculation to keep the irradiation light of the lamp to the predetermined direction in accordance with the signal from the vehicle state detection means and does not send the compensation signal to the drive means.

According to this invention, therefore, at the time of lighting the lamp or during lighting of the lamp, the compensation calculation associated with irradiation direction control is executed and the lamp or its components are driven based on a calculation result to the drive means, whereas at the time of deactivating the lamp or during deactivation of the lamp and with the power source of the vehicle in operation or during running of the vehicle, only the compensation calculation associated with irradiation direction control is executed

DETAILED DESCRIPTION OF THE PREFERRED EMBODIMENT

An irradiation direction control apparatus for a vehicular lamp according to this invention will now be described with reference to the accompanying drawings.

This invention is devised in such a manner that at the time of lighting a lamp or during lighting of the lamp, the compensation calculation to keep the irradiation light of the lamp to a predetermined direction is performed and the lamp or its components are driven based on the calculation result, whereas at the time of deactivating the lamp or during deactivation of the lamp and with the power source of a vehicle in operation or during running of the vehicle, the compensation calculation alone is performed and neither the lamp nor its components are driven. The expression "at the time of lighting a lamp" includes the point when lighting of the lamp is instructed and a period until the later issuance of a deactivating instruction, regardless of whether or not the lamp is actually lit. The expression "during lighting of the lamp" means the period during which the lamp is actually lit. Likewise, the expression "at the time of deactivating the lamp" includes the point when deactivation of the lamp is instructed and a period until the later issuance of a lighting instruction, regardless of whether or not the lamp is actually deactivated. The expression "during deactivation of the lamp" means the period during which the lamp is not actually lit. The expression "with the power source of a vehicle in operation" includes the point when the activation of the power source is instructed and the point when the power source is actually activated, and the expression "during running of the vehicle" means the period during which the vehicle is actually running.

Figure 1:
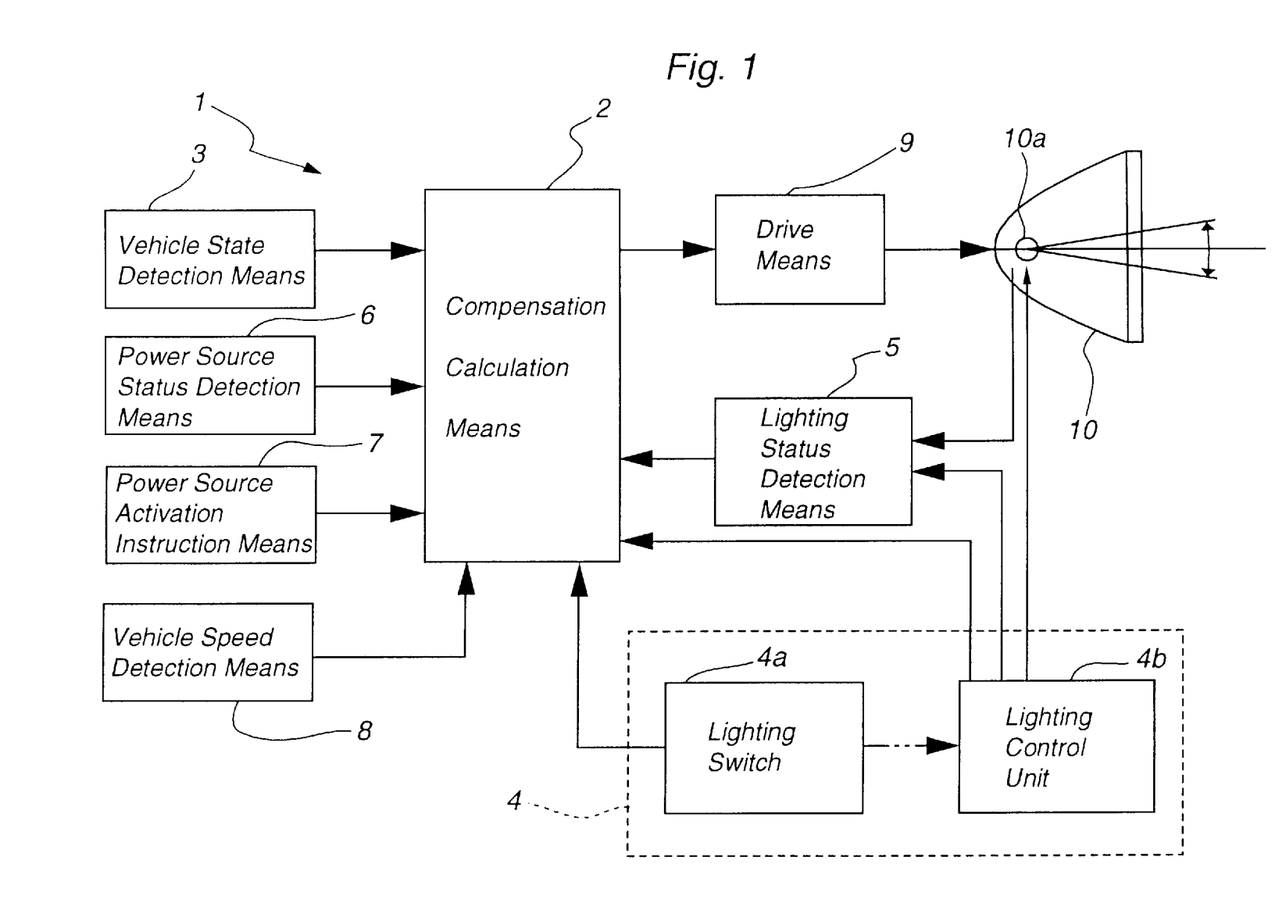
FIG. 1 is a block diagram for explaining the structure of an irradiation direction control apparatus for a vehicular lamp according to this invention.

FIG. 1 shows the basic structure of this invention. An irradiation direction control apparatus 1 has compensation calculation means 2 for controlling compensation for the irradiation direction of a lamp. Vehicle state detection means 3, lighting instruction means 4, lighting status detection means 5, power source status detection means 6, power source activation instruction means 7 and vehicle speed detection means 8 are input means to the compensation calculation means 2. A compensation signal output from the compensation calculation means 2 is sent to drive means 9, which controls the irradiation direction of a lamp 10 toward a predetermined direction.

Figure 2:
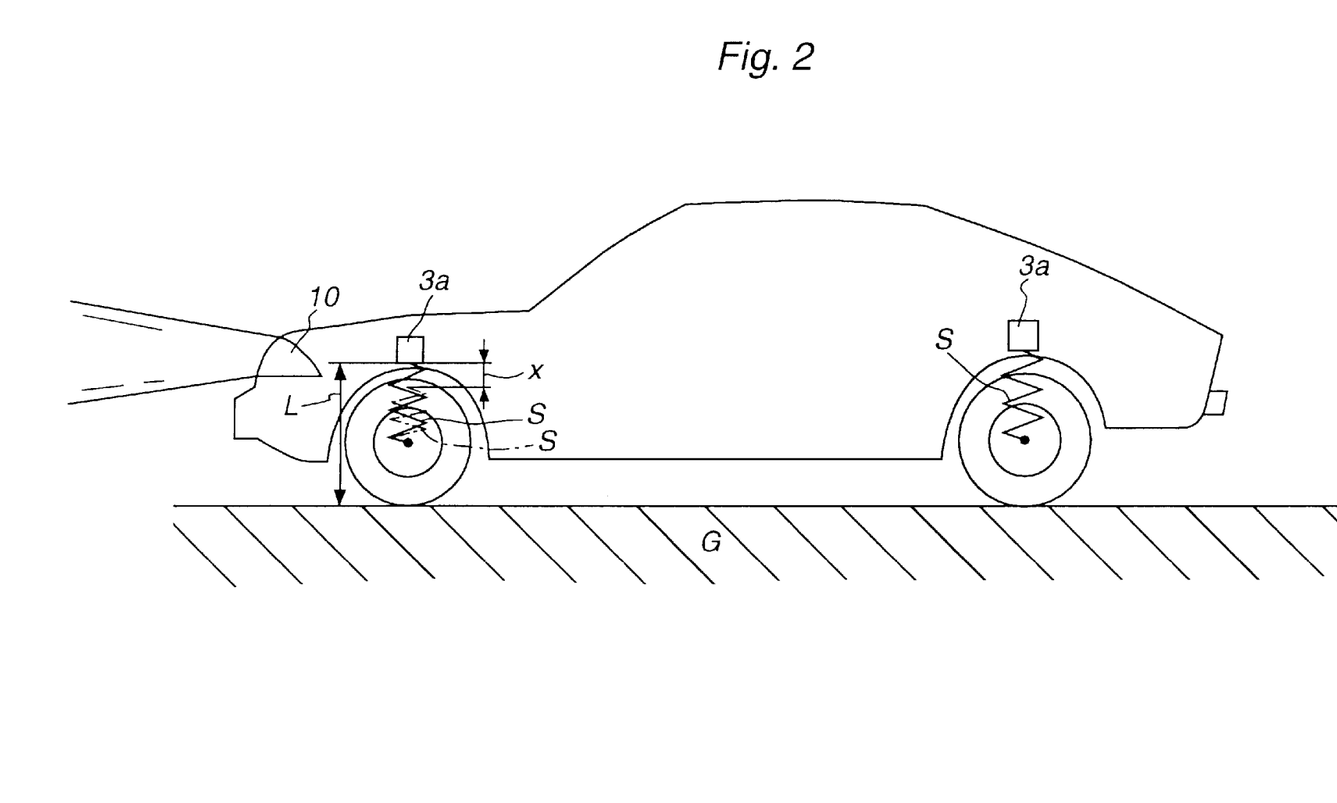
FIG. 2 is a schematic diagram of a vehicle for explaining vehicle height detection means.

The vehicle state detection means 3 is provided to detect the state of a vehicle (which includes the upward or downward inclination in the running direction of the vehicle) in position and/or in motion. When vehicle height detection means for detecting the height of the vehicle's body which varies in accordance with the roughness of a road is used for the vehicle state detection means 3, for example, as illustrated in FIG. 2, the distance L between the vehicle height detection means 3a and the road surface G may be measured using detection waves such as ultrasonics or laser light, or the vehicle height detection means 3a may detect the amount of expansion or contraction, x, of a suspension S to detect a vertical variation in the axle shaft. Both cases are advantageous in that an existing equipment of a vehicle can be used Another way of detecting the state of a vehicle is the use of a gyrosensor (which is used in a two wheeler).

The lighting instruction means 4 serves to instruct the lighting of a light source 10a in the lamp 10. As illustrated, for example, lighting instruction signals include instruction signals issued by an activation switch 4a and a lighting control unit 4b.

The instruction signals from the lighting control unit 4b include an instruction signal for automatically lighting the lamp 10 (e.g., a signal for automatically lighting the lamp upon detection that the environment around the vehicle becomes dark). Referring to FIG. 1, the arrow in a two dot and one dash line, which extends from the activation switch 4a to the lighting control unit 4b, means that the lighting of the light source 10a by the lighting control unit 4b is not restricted only to a manual operation.

This invention can utilize a signal from the lighting status detection means 5 which detects if the lamp 10 is actually lit. In this case, compensation control associated with the irradiation direction of the lamp 10 is executed only when the lighting of the lamp 10 is detected. This is because the irradiation direction control of the lamp is significant only during lighting of the lamp. When a discharge lamp is used for the light source 10a of the lamp 10, the lighting status detection means 5 may be provided as a part of the lighting circuit, so that a detection signal from the lighting status detection means 5 can be used.

The power source status detection means 6 and the power source activation instruction means 7 are essential to acquire a signal indicating the operational status of the power source of a vehicle and the activation instruction signal. The term "power source" is means which produces the driving power of the vehicle and includes the engine or motor (for an electric car) when the vehicle is an automobile.

The power source status detection means 6 provides a detection signal according to whether or not the power source is operating. In the case of an automobile, for example, a signal associated with the number of rotations of the engine or motor can be used, and the operation status of the power source can be determined from the vibration, temperature, etc. of the engine or the like.

The power source activation instruction means 7 generates an instruction signal to activate the power source, and may be a switch for instructing the ignition of the engine or the like in the case of an automobile. It is essential that setting on the switch surely activates the engine or the like or can be considered as the activation of the engine or the like.

The vehicle speed detection means 8 detects if the vehicle is running and acquires the running speed of the vehicle. When the vehicle is an automobile, for example, the vehicle speed detection means 8 is a speed meter which is an existing device. Alternatively, a high precision sensor may be added to the vehicle as such means.

The output signal of the vehicle state detection means 3 is sent to the compensation calculation means 2 where a compensation calculation associated with the irradiation direction control on the lamp 10 is executed. When the aforementioned vehicle height detection means is used as the vehicle state detection means 3, for example, changes in body height with respect to the axle shaft portions at the front and rear of the vehicle are detected, and a change in inclination angle (so-called pitching angle) in the front and rear direction of the vehicle is acquiredfrom the detected changes in body height and the distance between the shafts of axle shaft portions. Based on this inclination angle, the compensation calculation means 2 calculates a compensation signalfor canceling a change in the irradiation direction of the lamp 10 (which includes an instruction for a compensation angle for the irradiation direction of the lamp). This compensation signal becomes a control signal to be input to the drive means 9. The drive means 9 alters the positional state of the lamp 10 in such a way that the irradiation direction of the lamp 10 becomes opposite to the direction of the change by the same angle as the change in the pitching angle. As a result, the optical axis of the lamp 10 is always controlled so as to be kept to a given direction.

The following condition (i) or (ii) is essential to perform the above-described control of the driving of the lamp 10 in this invention.

(i) The lamp should be on.

(ii) The lighting of the lamp should be instructed

In other words, both conditions reflect the premise of the irradiation direction control of the lamp 10 that the lamp 10 should be on. The condition (i) is the detection of the lighting of the lamp 10 by the lighting status detection means 5, while the condition (ii) is the manual or automatic generation of the lighting instruction for the lamp 10 by the lighting instruction means 4.

Upon reception of the signal indicating the fulfillment of the condition (i) or (ii), the compensation calculation means 2 performs the aforementioned compensation calculation and sends the compensation signal to the drive means 9 to change the irradiation direction of the lamp 10.

Further, the status of the power source of the vehicle and the stationary/running state of the vehicle are monitored in this invention. When neither the condition (i) nor (ii) is satisfied but the following condition (iii) or (iv) is met, only the compensation calculation associated with the irradiation direction control by the compensation calculation means 2 is performed and no drive control of the lamp 10 is performed by the drive means 9. When neither the condition (iii) nor (iv) is fulfilled, even the compensation calculation is not carried out.

(iii) The activation of the power source is instructed or detected.

(iv) Running of the vehicle is detected.

Those conditions are needed to spontaneously initiate the drive control of the lamp 10 when the lamp 10 in the OFF state is lit or a lighting instruction is given at the time the power source is activated or while the vehicle is running. At the time the power source is activated or while the vehicle is running (on the condition that the lamp is turned off or kept off), the drive means 9 is not activated but is set to a standby mode. This standby mode means the stop of the operation of the drive means 9 while the vehicle is running during daytime (in which the lamp is turned off), thus making it possible to reduce the consumed power of the apparatus and improve the durability of the apparatus.

Figure 3:
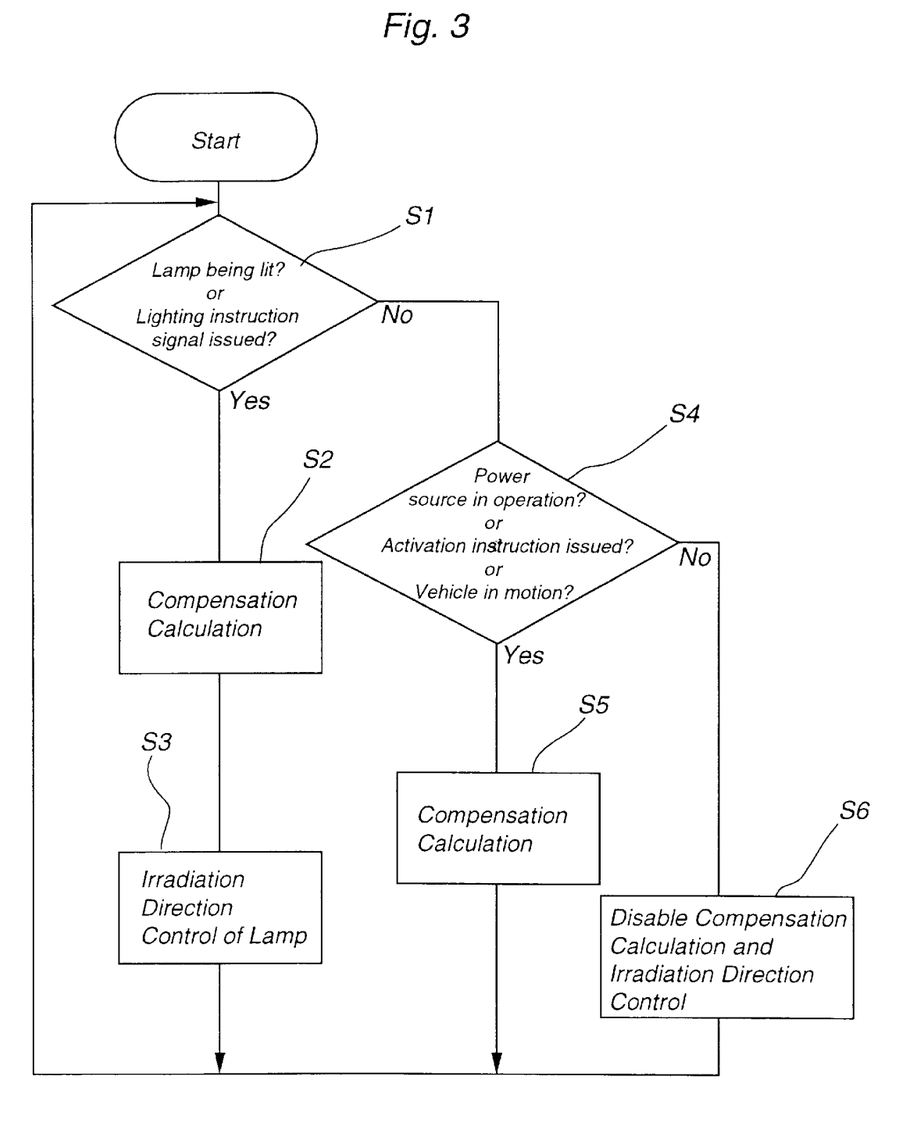
FIG. 3 is a flowchart for explaining the flow of control.

FIG. 3 is a flowchart schematically illustrating the control according to this invention. First, it is determined in step S1 if the lamp is on or if the lighting instruction has been issued. If the determination is affirmative, the flow proceeds to step S2, whereas if the determination is negative, the flow proceeds to step S4.

The compensation calculation means 2 performs a compensation calculation for keeping the irradiation direction of the lamp 10 to a predetermined direction based on the detection signal from the vehicle state detection means 3 in step S2. In the subsequent step S3, the compensation calculation means 2 sends a compensation signal, acquired as a result of the compensation calculation, to the drive means 9 to execute the irradiation direction control of the lamp 10. The flow then returns to step S1.

In step S4, it is determined if the power source of the vehicle is operating or if the activation instruction for that power source has been issued, or whether or not the vehicle is running. When the determination is affirmative, the flow proceeds to step S5, whereas if the determination is negative, the flow proceeds to step S6.

In step S5, the compensation calculation means 2 merely performs the compensation calculation associated with the irradiation direction control of the lamp 10 after which the flow returns to step S1.

In step S6, both the compensation calculation by the compensation calculation means 2 and the compensation for the irradiation direction of the lamp 10 by the drive means 9 are disabled after which the flow returns to step S1.

The drive control of the lamp 10 in step S3 may be accomplished by causing the drive means 9 to tilt the entire lamp to thereby change the irradiation direction, or by controlling the driving of some of the components of the lamp. For example, the reflector may be inclined in the vertical plane by the drive means 9 to alter the direction of reflected light (see Japanese Unexamined Patent Publication No. Sho 59-195441, for example) or the lens may be inclined by the drive means 9 to alter the direction of irradiation light which has passed the lens (see Japanese Unexamined Patent Publication No. Hei 7-37405, for example). Positional control may be performed on a part of the reflector or the lens, instead of tilting the entire reflector or lens, to change the essential portion of the irradiation light to the desired direction. Another way is to move the shade to a predetermined direction by the drive means 9 to vertically change the boundary between brightness and darkness of the light distribution pattern of the lamp 10 (see Japanese Unexamined Patent Publication No. Hei 7-29401, for example). Various other modes are also possible by controlling the optical components of the lamp in various combinations, e.g., by moving the reflector and the light source, the lens and the reflector, or the lens and the shade together by the drive means 9 to vertically change the direction of the irradiation light.

Figure 4:
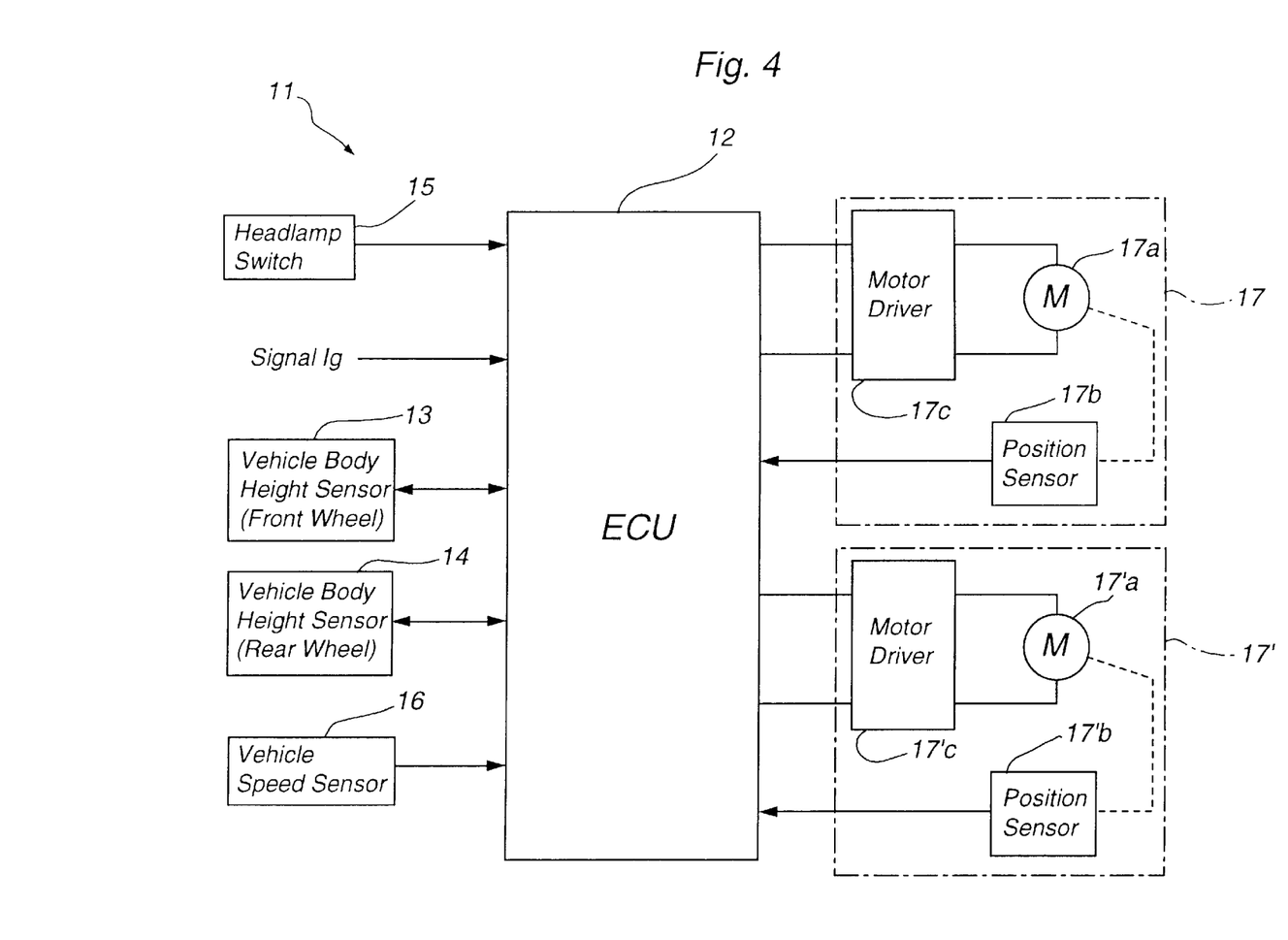
FIG. 4 is a block diagram illustrating one embodiment of this invention.
Figure 5:
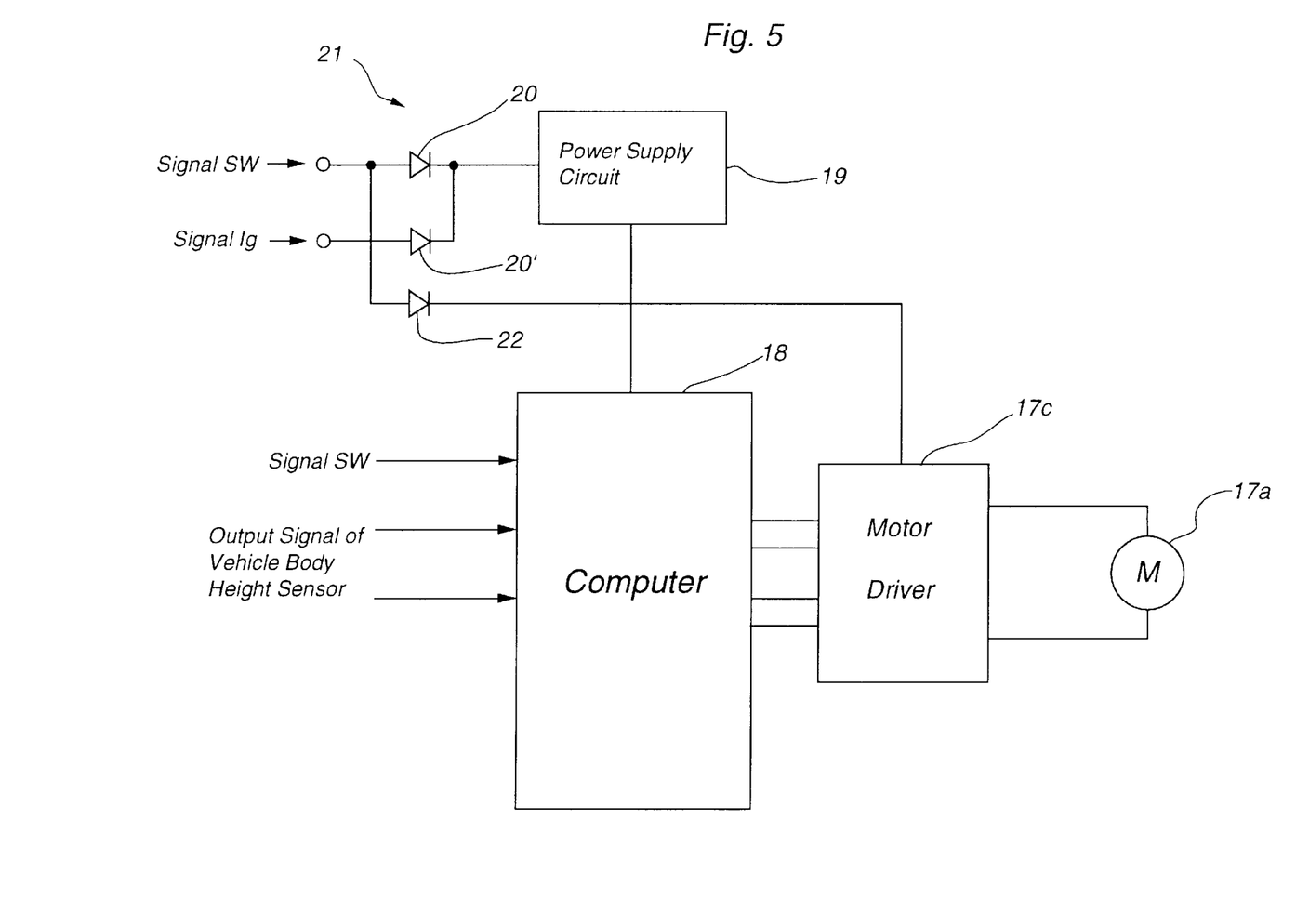
FIG. 5 is a diagram exemplifying the structure of the essential portion of the embodiment.
Figure 6:
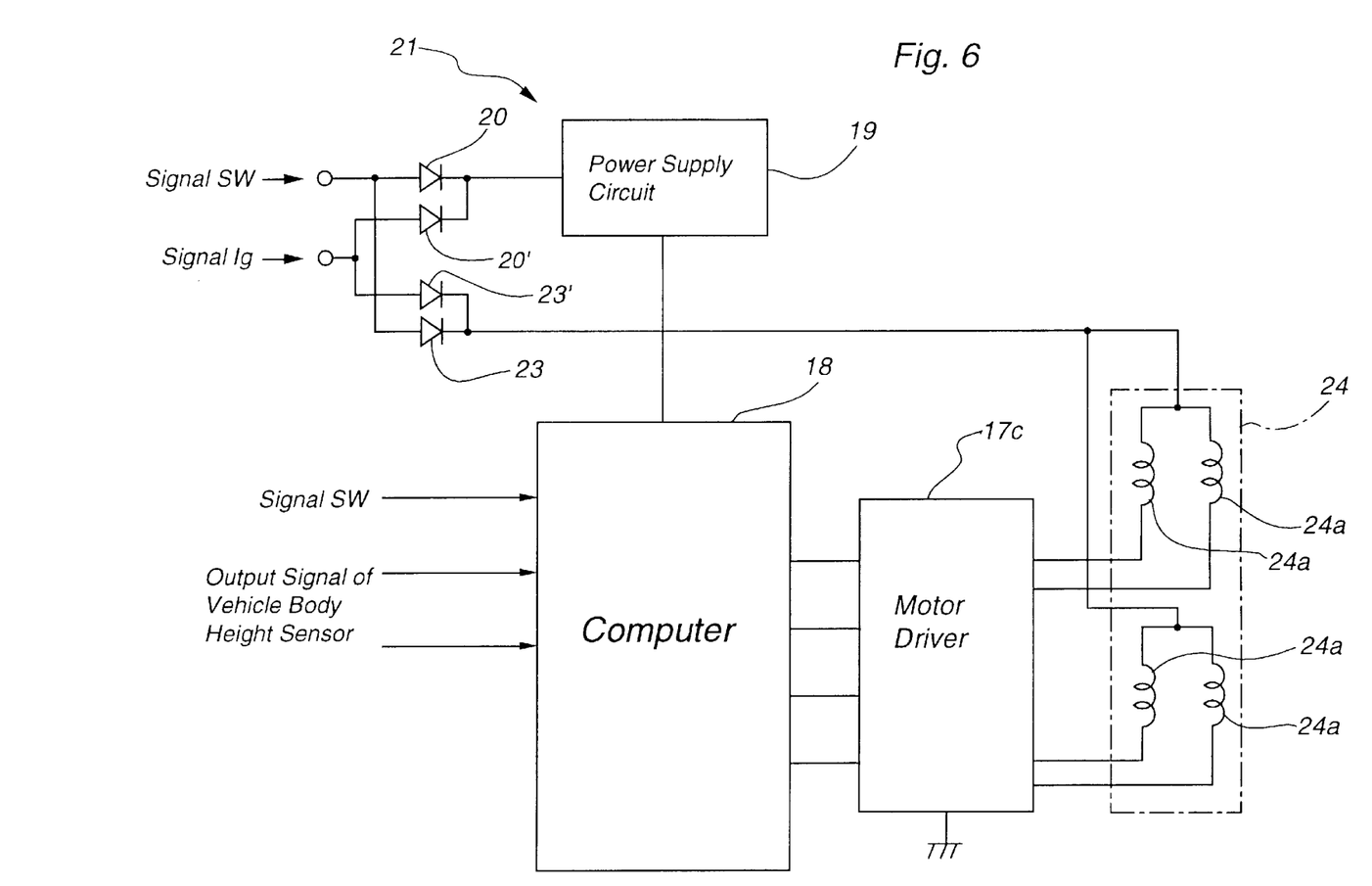
FIG. 6 is a diagram exemplifying the structure of the essential portion of the embodiment when a stepping motor is used for the drive source.

FIGS. 4 through 6 illustrate one embodiment of this invention as adapted to an automobile.

FIG. 4 shows the structure of an irradiation direction control apparatus 11 that has an ECU (Electronic Control Unit) 12 incorporating a computer which accomplishes the function of the compensation calculation means 2. Input signals to the ECU 12 are detection signals from vehicle body height sensors 13 and 14, respectively provided at the front and rear axle shaft portions of the vehicle, a lighting instruction signal SW issued by a headlamp switch 15, an ignition signal Ig which ignites the engine and a detection signal from a vehicle speed sensor 16.

The vehicle body height sensors 13 and 14 are equivalent to the vehicle state detection means 3. When the detection signals from those vehicle body height sensors 13 and 14 are input to the ECU 12, the ECU 12 computes a change in the pitching angle of the vehicle from height changes of the front and rear axle shaft portions of the vehicle to perform a compensation calculation for keeping the irradiation direction of each lamp to a predetermined direction. Although the output signals of the vehicle body height sensors 13 and 14 are supplied into the ECU 12, for each predetermined time interval, to compute the pitching angle in this embodiment, any computation scheme may be employed in this invention. Although two vehicle body sensors are respectively provided at the front and rear axle shaft portions of the vehicle in this embodiment, the vehicle body sensor may of course be provided at one or each of the right front and rear wheels and the left front and rear wheels.

The headlamp switch 15 is equivalent to the lighting instruction means 4, and the lighting instruction signal SW is input to the ECU 12 when this switch 15 is set on.

The ignition signal Ig is issued from the circuitry on the vehicle side and is input to the ECU 12, when the engine is activated, and which is equivalent to the signal issued from the power source activation instruction means 7 or the power source detection means 6. That is, the supply of the signal Ig to the ECU 12 is considered as the engine having been activated.

The vehicle speed sensor 16 is provided to determine the running or stop of the automobile and detect the running speed. The detection signal from this sensor 16 is used in the computation of the acceleration and as information or the like to distinguish the control mode associated with the irradiation direction control of the lamps.

The compensation signal which is output from the ECU 12 is sent to driving sections 17 and 17' for respectively controlling the irradiation directions of the left and right headlamps of the vehicle. The driving sections 17 and 17' respectively include motors 17a and 17'a for driving the lamps or their components (the reflectors, lenses, etc.), and position sensors 17b and 17'b for detecting the positional states of the lamps or their components. The output signal of the ECU 12 is sent to the motors 17a and 17'a directly or via motor drivers 17c and 17'c, and detection signals from the position sensors 17b and 17'b are sent to the ECU 12.

When the lighting instruction signal SW is input to the ECU 12 in the irradiation direction control apparatus 11, the pitching angle of the vehicle is calculated based on the detection signals from the vehicle body height sensors 13 and 14 and the compensation signal for changing the irradiation directions of the lamps by a compensation angle, which is the same as the computed pitching angle but in the opposite direction to the changing direction of the pitching angle, is acquired in the ECU 12. This compensation signal is sent to the driving sections 17 and 17' to drive the lamps or their components.

When the signal Ig, not the signal SW, is input to the ECU 12 to activate the engine, only the calculation of the pitching angle and the compensation calculation associated with the irradiation direction control are performed in the ECU 12, and no compensation signal is sent to the driving sections 17 and 17'.

While the above-described control operation can be accomplished by software processing conducted by a program in the ECU 12, it may also easily be accomplished by the hardware structure as shown in FIG. 5.

FIG. 5 exemplifies the structure of the essential portion. The signals SW and Ig are input to a power supply circuit 19 for supplying power to a computer 18, the control core, via an OR gate 21, which comprises diodes 20 and 20'. In this case, the signal SW has an H (High) level when lighting is instructed and has an L (Low) level when extinguishing is instructed, while the signal Ig has an H level when the engine is activated and has an L level otherwise.

The power supply circuit 19 is designed to supply power to the computer 18 when the signal SW or the signal Ig has an H level.

The signal SW is supplied via the diode 22 to the power terminal of the motor driver 17c (although FIG. 5 shows only the motor driver associated with one lamp, the motor driver associated with the other lamp has the same structure). The motor 17a is driven only when the signal SW has an H level That is, the permission and inhibition of the driving of the motor are defined by the signal SW alone.

As power is supplied to the computer 18 when the signal SW has an H level according to this circuit structure, the calculation of the pitching angle and the compensation calculation associated with the irradiation direction control are performed inside the computer 18, and power is supplied to the motor driver 17c to drive the motor 17a in response to the signal SW supplied via the diode 22.

When the signal SW has an L level and the signal Ig has an H level, the motor driver 17c is not activated though power is supplied to the computer 18. In this case, therefore, the calculation of the pitching angle and the compensation calculation associated with the irradiation direction control are just performed.

With regard to the drive means 9 which includes a drive source and its driver, it is necessary to grasp the status of the drive source at the beginning of control on the drive source by the driver in some cases.

With a stepping motor used for the aforementioned motor, for example, full-stroke driving of the rotor may have to be executed once at the beginning in some case to grasp the control position of the motor at the beginning of control on the motor. A time delay originated from the time required for that operation should be coped with. In the case where the headlamp switch 15 has been off during running of the vehicle and the irradiation direction control apparatus 11 is not in operation, if the irradiation direction control apparatus 11 is activated by setting on the headlamp switch 15 from this state, a time loss is caused by the aforementioned full-stroke driving of the stepping motors which is performed until the lamps or their components are moved to the control positions indicated by the compensation signal after the activation of the apparatus 11. This disables the spontaneous irradiation direction control of the lamps.

When the vehicle in motion is detected or when the power source of the vehicle is activated or its activation instruction has been issued, therefore, the aforementioned initial driving associated with the stepping motors is performed at the time of supplying power to the irradiation direction control apparatus 11 after which the operation mode goes to the standby mode to execute only the compensation calculation associated with the irradiation direction control. This design can allow the stepping motors to promptly drive the lamps or their components to the control positions indicated by the compensation signal when the lamps are lit or the lighting instruction has been issued FIG. 6 exemplifies the structure of the essential portion of the irradiation direction control apparatus which uses stepping motors. This structure differs from the one shown in FIG. 5 in that an OR signal of the signal SW and the signal Ig, obtained by the diodes 23 and 23', are supplied as the supply voltage to coils 24a of a stepping motor 24 and the motor driver 17c is comprised of semiconductor switch elements, dumpers or the like, which directly drive the coils 24a of the individual phases.

Specifically, when the signal SW or the signal Ig has an H level, power is supplied to the computer 18 and the stepping motor 24 from the power supply circuit 19. At this time the computer 18 runs the initial program to execute the full-stroke driving of the stepping motor 24 via the motor driver 17c once at the beginning to grasp the control position at the beginning of the control.

According to the first aspect of this invention, as described above, at the time of deactivating the lamp or during deactivation of the lamp and with the power source of the vehicle in operation or during running of the vehicle, only the compensation calculation associated with irradiation direction control is executed. This prevents wasteful power consumption and the life of the auto-leveling apparatus becoming shorter and improves the statability of the auto-leveling apparatus.

According to the second aspect of this invention, the lighting instruction means for manually or automatically instructing the lighting of the lamp serves as the apparatus's activation instruction means. This makes the structure of the apparatus simpler.

According to the third aspect of this invention, only when the lighting of the lamp is detected by the lighting status detection means which detects if the lamp is lit, the compensation calculation associated with the irradiation direction control and the driving of the lamp and its components by the drive means are executed. When the lamp is not actually lit even though the lamp lighting instruction has been issued, the drive means is not activated. This can suppress wasteful power consumption.

According to the fourth aspect of this invention, it is possible to determine if the compensation calculation associated with the irradiation direction control on the lamp should be performed by using the instruction signal for activating the power source of the vehicle. This allows the apparatus to have a simpler structure.

According to the fifth aspect of this invention, it is possible to determine if the compensation calculation associated with the irradiation direction control on the lamp should be performed by using the detection signal indicating the operational status of the power source of the vehicle. This can ensure the control which matches with the operational status of the vehicle.

According to the sixth aspect of this invention, in the case where the vehicle in motion is detected or where the power source of the vehicle is activated or the activation instruction to the power source has been issued, when the apparatus is powered on, the drive source is driven by the driver to grasp the control position at the beginning of the control. This can prevent the operation time from being delayed when the lamp is lit while the vehicle is moving or while the power source is in operation.

According to the seventh aspect of this invention, changes in body heights of the front and rear axle shaft portions of the vehicle are detected by the vehicle height detection means, the inclination angle in the front and rear direction of the vehicle is computed based on the detected changes and the distance between the shafts of axle shaft portions, and the compensation signal for changing the irradiation directions of the lamps by whose compensation angle is the same as or substantially equal to the inclination angle but in the opposite direction to the changing direction of the inclination angle, is used to cancel a change in the irradiation direction of the lamp caused by a change in the vehicle's positional state. This facilitates the compensation calculation. When the vehicle height detection means is an existing unit installed in the vehicle, the detection signal of this vehicle height detection means can be used.

What is claimed is:

1. An irradiation direction control apparatus for a vehicular lamp, comprising:

vehicle state detection means for detecting a state of a vehicle;

drive means for directing irradiation light of a lamp toward a desired direction; and compensation calculation means for performing a compensation calculation to keep said irradiation light of said lamp to a predetermined direction in accordance with a signal from said vehicle state detection means and sending a compensation signal to said drive means, whereby at a time of lighting said lamp or during lighting of said lamp, said compensation calculation means performs said compensation calculation to keep said irradiation light of said lamp to said predetermined direction in accordance with said signal from said vehicle state detection means and sends said compensation signal based on a calculation result to said drive means to drive said lamp or components thereof, whereas at a time of deactivating said lamp or during deactivation of said lamp and with a power source of said vehicle in operation or during running of said vehicle, said compensation calculation means performs only said compensation calculation to keep said irradiation light of said lamp to said predetermined direction in accordance with said signal from said vehicle state detection means and does not send said compensation signal to said drive means.

2. The irradiation direction control apparatus according to claim 1, wherein when lighting of said lamp is instructed by a lighting instruction means for manually or automatically instructing lighting of said lamp, said compensation calculation associated with irradiation direction control by said compensation calculation means and driving of said lamp or components thereof by said drive means are performed.

3. The irradiation direction control apparatus according to claim 1, wherein when lighting of said lamp is detected by said lighting status detection means for detecting if a lamp is lit, said compensation calculation associated with irradiation direction control by said compensation calculation means and driving of said lamp and said components thereof by said drive means are executed.

4. The irradiation direction control apparatus according to claim 1, wherein when said compensation calculation means determines that said vehicle has been activated based on an instruction signal from power source activation instruction means for activating said power source of said vehicle, said compensation calculation means performs said compensation calculation associated with irradiation direction control on said lamp.

5. The irradiation direction control apparatus according to claim 4, wherein said power source activation instruction means is a switch for instructing activation of said power source.

6. The irradiation direction control apparatus according to claim 1, wherein when said compensation calculation means determines that said vehicle has been activated based on a detection signal from power source status detection means for detecting an operational status of said power source of said vehicle, said compensation calculation means performs said compensation calculation associated with irradiation direction control on said lamp.

7. The irradiation direction control apparatus according to claim 6, wherein said power source is an engine for an automobile, and said detection signal of said power source status detection means is a signal associated with a number of rotations of a part of said engine.

8. The irradiation direction control apparatus according to claim 6, wherein said power source status detection means detects an operational status of said power source from a parameter of said power source including one of vibration and temperature.

9. The irradiation direction control apparatus according to claim 1, further comprising vehicle speed detection means for detecting if said vehicle is running and a running speed thereof.

10. The irradiation direction control apparatus according to claim 9, wherein said vehicle speed detection means is a speed meter.

11. The irradiation direction control apparatus according to claim 9, wherein said vehicle speed detection means is a sensor, and said sensor is separate from a speed meter of said vehicle.

12. The irradiation direction control apparatus according to claim 1, wherein said drive means has a drive source and a driver for said drive source, whereby in a case where said vehicle in motion is detected or where said power source of said vehicle is activated or an activation instruction to said power source has been issued, when said apparatus is powered on, said drive source is driven by said driver to grasp a control position at beginning of control.

13. The irradiation direction control apparatus according to claim 1, wherein said vehicle state detection means is body height detection means provided at front and rear axle shaft portions of said vehicle, said compensation calculation means calculates an inclination angle in a front and rear direction of said vehicle based on a detection signal from said body height detection means and a distance between shafts of said axle shaft portions, and a compensation signal indicating a compensation angle equal or substantially equal to said inclination angle but in an opposite direction to a changing direction of said inclination angle, is sent to said drive means as a signal to cancel a change in an irradiation direction of said lamp caused by a change in said inclination angle of said vehicle.

14. The irradiation direction control apparatus according to claim 1, wherein said power source is an engine for an automobile.

15. The irradiation direction control apparatus according to claim 1, wherein said power source is a motor for an electric automobile.

* * * * *